US008521356B2

(12) United States Patent
Uto

(10) Patent No.: US 8,521,356 B2
(45) Date of Patent: Aug. 27, 2013

(54) AIR CONDITIONER FOR VEHICLE, AND SYSTEM AND METHOD OF VEHICLE AIR-CONDITIONING MANAGEMENT

(75) Inventor: Taichi Uto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 380 days.

(21) Appl. No.: 12/991,533

(22) PCT Filed: Jun. 11, 2008

(86) PCT No.: PCT/JP2008/060636
§ 371 (c)(1),
(2), (4) Date: Nov. 8, 2010

(87) PCT Pub. No.: WO2009/150724
PCT Pub. Date: Dec. 17, 2009

(65) Prior Publication Data
US 2011/0071722 A1    Mar. 24, 2011

(51) Int. Cl.
*G06F 19/00*    (2011.01)
(52) U.S. Cl.
USPC ............... 701/30; 62/157; 62/228.5; 62/515; 700/276
(58) Field of Classification Search
USPC ............ 701/30, 29.4, 31.4, 31.6; 62/228.3, 62/157, 228.5, 515; 700/276
See application file for complete search history.

(56) References Cited

U.S. PATENT DOCUMENTS

| | | | | |
|---|---|---|---|---|
| 4,856,293 A | * | 8/1989 | Takahashi | 62/228.3 |
| 4,878,358 A | * | 11/1989 | Fujii | 62/227 |
| 5,199,274 A | * | 4/1993 | Yoshida et al. | 62/228.4 |
| 5,323,619 A | * | 6/1994 | Kim | 62/160 |
| 5,335,514 A | * | 8/1994 | Hennessee et al. | 62/227 |
| 5,467,605 A | * | 11/1995 | Hennessee et al. | 62/133 |
| 5,533,353 A | * | 7/1996 | Baker et al. | 62/227 |
| 5,537,831 A | * | 7/1996 | Isaji et al. | 62/228.4 |
| 5,752,387 A | * | 5/1998 | Inagaki et al. | 62/133 |

(Continued)

FOREIGN PATENT DOCUMENTS

| | | |
|---|---|---|
| JP | 8-094220 A | 4/1996 |
| JP | 2004-291899 A | 10/2004 |

(Continued)

OTHER PUBLICATIONS

International Search Report (PCT/ISA/210) issued on Aug. 19, 2008, by Japanese Patent Office as the International Searching Authority for International Application No. PCT/JP2008/060636.

(Continued)

*Primary Examiner* — Tuan C. To
(74) *Attorney, Agent, or Firm* — Buchanan Ingersoll & Rooney PC

(57) ABSTRACT

A management system for vehicle air-conditioning and a method of managing the same are provided. Changes of a temperature in a vehicle from various environmental information, between a standard for showing a comfortable environment in the vehicle and actual environment information, are recognized to identify abnormalities occurring in components at an early stage and to appropriately judge the necessity and urgency of maintenance. A management system of vehicle air-conditioning includes an air-conditioning controller that predicts abnormalities of components of the refrigeration cycle by comparing a temperature in the vehicle obtained when the refrigeration cycle is actually driven with a preset temperature in the vehicle that constitutes a standard.

7 Claims, 4 Drawing Sheets

(56) References Cited

U.S. PATENT DOCUMENTS

| | | | |
|---|---|---|---|
| 5,829,264 A * | 11/1998 | Ishigaki et al. | 62/228.3 |
| 5,924,296 A * | 7/1999 | Takano et al. | 62/133 |
| 6,148,632 A * | 11/2000 | Kishita et al. | 62/323.1 |
| 6,250,093 B1 * | 6/2001 | Fujii et al. | 62/228.3 |
| 6,553,775 B2 * | 4/2003 | Togaru et al. | 62/133 |
| 6,823,684 B2 * | 11/2004 | Jensen | 62/171 |
| 8,104,299 B2 * | 1/2012 | Okamoto et al. | 62/157 |
| 2002/0184899 A1 * | 12/2002 | Togaru et al. | 62/133 |
| 2006/0048524 A1 * | 3/2006 | Komatsu | 62/126 |
| 2006/0070387 A1 * | 4/2006 | Yamaguchi et al. | 62/186 |
| 2006/0191280 A1 * | 8/2006 | Kurosawa | 62/324.1 |
| 2007/0245754 A1 * | 10/2007 | Lee et al. | 62/228.5 |
| 2008/0168784 A1 * | 7/2008 | Choi et al. | 62/157 |
| 2008/0202452 A1 * | 8/2008 | Wakahara et al. | 123/41.15 |
| 2008/0269977 A1 * | 10/2008 | Palladino | 701/30 |

FOREIGN PATENT DOCUMENTS

| | | | | |
|---|---|---|---|---|
| JP | 2005-132167 A | | 5/2005 | |
| JP | 2007-083872 A | | 4/2007 | |
| JP | 2007145104 A | * | 6/2007 | |
| JP | 2007212010 A | * | 8/2007 | |
| JP | 2007269186 A | * | 10/2007 | |
| JP | 2007276611 A | * | 10/2007 | |
| JP | 2007307974 A | * | 11/2007 | |

OTHER PUBLICATIONS

Office Action (Notification of Reasons for Refusal) dated Aug. 7, 2012, issued by the Japanese Patent Office in corresponding Japanese Patent Application No. 2010-516679 and an English translation thereof. (7 pages.

Office Action (Notification of the First Office Action) dated Sep. 6, 2012, issued in corresponding Chinese Patent Application No. 200880129713.0, and an English Translation thereof. (11 pages).

Office Action from Chinese Patent Office dated Apr. 17, 2013, Issued in corresponding Chinese Patent Application No. 200880129713.0, with an English translation thereof. (12 pages).

* cited by examiner

| No. | Average temperature difference | Evaluation |
|---|---|---|
| 1 | Less than 0 degree to 1 degree | Normal |
| 2 | Less than 1 degree to 2 degree | Stain conditions: level 1 |
| 3 | Less than 2 degree to 3 degree | Stain conditions: level 2 |
| 4 | Equal to or larger than 4 degree | Deterioration conditions |

AIR CONDITIONER FOR VEHICLE, AND SYSTEM AND METHOD OF VEHICLE AIR-CONDITIONING MANAGEMENT

TECHNICAL FIELD

The present invention relates to an air-conditioner for a vehicle capable of detecting stain and degradation conditions in the component of a refrigeration cycle at an early stage, a vehicle air-conditioning management system that appropriately judges necessity and urgency of maintenance, and a method of managing vehicle air-conditioning.

BACKGROUND ART

Conventionally, there is an air-conditioner for a railroad vehicle mounted on a vehicle such as a railway. With such an air-conditioner for a railroad vehicle, maintenance works such as investigation, inspection, repair, cleaning, and maintenance are usually performed on a regular basis in order to make the environment in the vehicle comfortable. However, the most suitable maintenance date varies in accordance with use conditions of the air-conditioner for a railroad vehicle. Variations in the temperature in the vehicle sometimes occur even in the case of a single coach train due to performance decline. At present, workers such as maintenance personnel and crew check temperature conditions of each vehicle using a monitor in an operators room to notice a maintenance division of abnormal temperature in the vehicle, if any, and perform maintenance work.

There may be a difference between an actual temperature in the vehicle and a temperature checked by workers using the monitor because of a passenger boarding rate and an outdoor air temperature. Therefore, it is not possible to appropriately judge whether maintenance work is necessary with the temperature as it is. In order to appropriately judge the necessity of maintenance work, maintenance personnel has to uncover the air-conditioner for the railroad vehicle to perform visual inspection on each component (a compressor, condenser, evaporator, and the like) therein. Accordingly, much time is needed to judge the necessity of maintenance work. Thereby, labor and cost increased of maintenance personnel needed for the maintenance work.

Therefore, "a vehicle air-conditioning management system is proposed having a refrigerant cycle constituted by serially connecting a compressor, a condenser, pressure reduction means, and an evaporator by refrigerant piping. With the vehicle air-conditioning management system, a controller is provided that controls the compressor according to predetermined conditions. A standard operation pattern is preset that shows an appropriate operating condition of the compressor in the controller. An actual operation pattern obtained by actually operating the compressor and the standard operation pattern are compared. Base on the comparison results, stain and degradation are judged in components constituting the refrigeration cycle." (For example, refer to Patent Document 1) The present vehicle air-conditioning management system enables early judgment on the necessity of maintenance work.

"A vehicle air-conditioning management system having a vehicle air-conditioning controller which is installed in a train vehicle to transmit data having operation information of an air-conditioner mounted on the vehicle and position information of the vehicle on a regular basis and a management computer which stores and processes the data transmitted from the vehicle air-conditioning controller" is proposed. (For example, refer to Patent Document 2) The vehicle air-conditioning management system transmits data including any of outdoor heat exchanger images, indoor heat exchanger images, and filter images of vehicle air-conditioning or electrical current values of a blower to a management computer on a regular basis. Thereby, maintenance time can be identified by analyzing the image by a management computer.

Patent Document 1 Japanese Unexamined Patent Application Publication No. 2007-083872 (page 5, FIG. 2, etc.)
Patent Document 2 Japanese Unexamined Patent Application Publication No. 2004-291899 (page 5, FIG. 7, etc.)

SUMMARY OF INVENTION

Problems to be Solved by the Invention

In the vehicle air-conditioning management system according to Patent Document 1, no descriptions are given to how to communicate the necessity of maintenance work to a maintenance division, so that countermeasures for the case of emergencies are problems. In the vehicle air-conditioning management system according to Patent Document 2, image information and current values of a blower are transmitted on a regular basis and detailed investigation and analysis can be performed in association with a route and position and the like, however, countermeasures for the case of emergencies are problems, as well.

The present invention is made to solve the above problems, and its object is to provide an air-conditioner for a vehicle which grasps changes in temperature in the vehicle from various environment information to be a standard showing a comfortable environment in the vehicle and actual environment information to detect abnormalities occurred in components at an early stage. Another object of the present invention is to provide a vehicle air-conditioning management system and method of managing the same capable of accurately judging the necessity and urgency of maintenance based on information from the air-conditioner for a vehicle.

Means for Solving the Problems

An air-conditioner for a vehicle according to the present invention includes a refrigeration cycle whose components are at least a compressor, a condenser, a pressure reducing device, and an evaporator and an air-conditioning controller which controls the refrigeration cycle. The air-conditioner for the vehicle is characterized in that the air-conditioning controller predicts stain and deterioration conditions of components of the refrigeration cycle from a difference between a temperature T1 in a vehicle in association with at least a passenger boarding rate and an outdoor air temperature and an actual temperature T2 in the vehicle, every air-conditioning preset temperature of each vehicle.

A vehicle air-conditioning management system according to the present invention is characterized in that the above air-conditioner for the vehicle and a management computer are provided, which is installed in the maintenance division and judges a maintenance time of the components of the refrigeration cycle by applying the comparison result from the air-conditioning controller to a preset predetermined evaluation standard.

A method of managing vehicle air-conditioning according to the present invention predicts abnormalities of components of a refrigeration cycle mounted on a vehicle to judge a maintenance time of the components. The method is characterized by comparing a temperature T1 in the vehicle stored in storage means in association with at least a passenger boarding rate and an outdoor air temperature with a temperature T2 in the vehicle obtained when the refrigeration cycle is actually driven every air-conditioning preset temperature, predicting abnormalities of the components of the refrigeration cycle based on the comparison result of the temperatures, judging a maintenance time of the components of the refrigeration cycle by applying the comparison result to a preset predetermined evaluation standard, and transmitting the judgment result of the maintenance time to a maintenance division.

Effect of the Invention

By an air-conditioner for a vehicle according to the invention, by comparing a preset temperature T1 in the vehicle to be a standard and an actual temperature T2 in the vehicle, a performance decline of the refrigeration cycle is judged and an occurrence of abnormalities can be predicted in the components of the refrigeration cycle. That is, with no requirement for maintenance work on a regular basis, an early detection of abnormalities in the components of the refrigeration cycle becomes possible and support of a comfortable environment in the vehicle becomes feasible with ease.

By a vehicle air-conditioning management system according to the present invention, based on information from the air-conditioner for the vehicle, it is possible to appropriately judge the maintenance time of the components of the refrigeration cycle and support of a comfortable environment in the vehicle becomes feasible with ease.

By a method of managing vehicle air-conditioning according to the present invention, by comparing a temperature T1 in the vehicle in association with at least a passenger boarding rate and an outdoor air temperature and an actual temperature T2 in the vehicle for each air-conditioning preset temperature, performance decline of the refrigeration cycle is judged and occurrence of abnormalities in the components of the refrigeration cycle is predictable. Therefore, based on the prediction results, it is possible to appropriately judge a maintenance time of the components of the refrigeration cycle and support of a comfortable environment in the vehicle becomes feasible with ease. Further, judgment results on the maintenance time can be directly transmitted to the maintenance division. Therefore, necessity of a maintenance work on a regular basis can be improved and labor costs and the like can be reduced.

Figure 1:
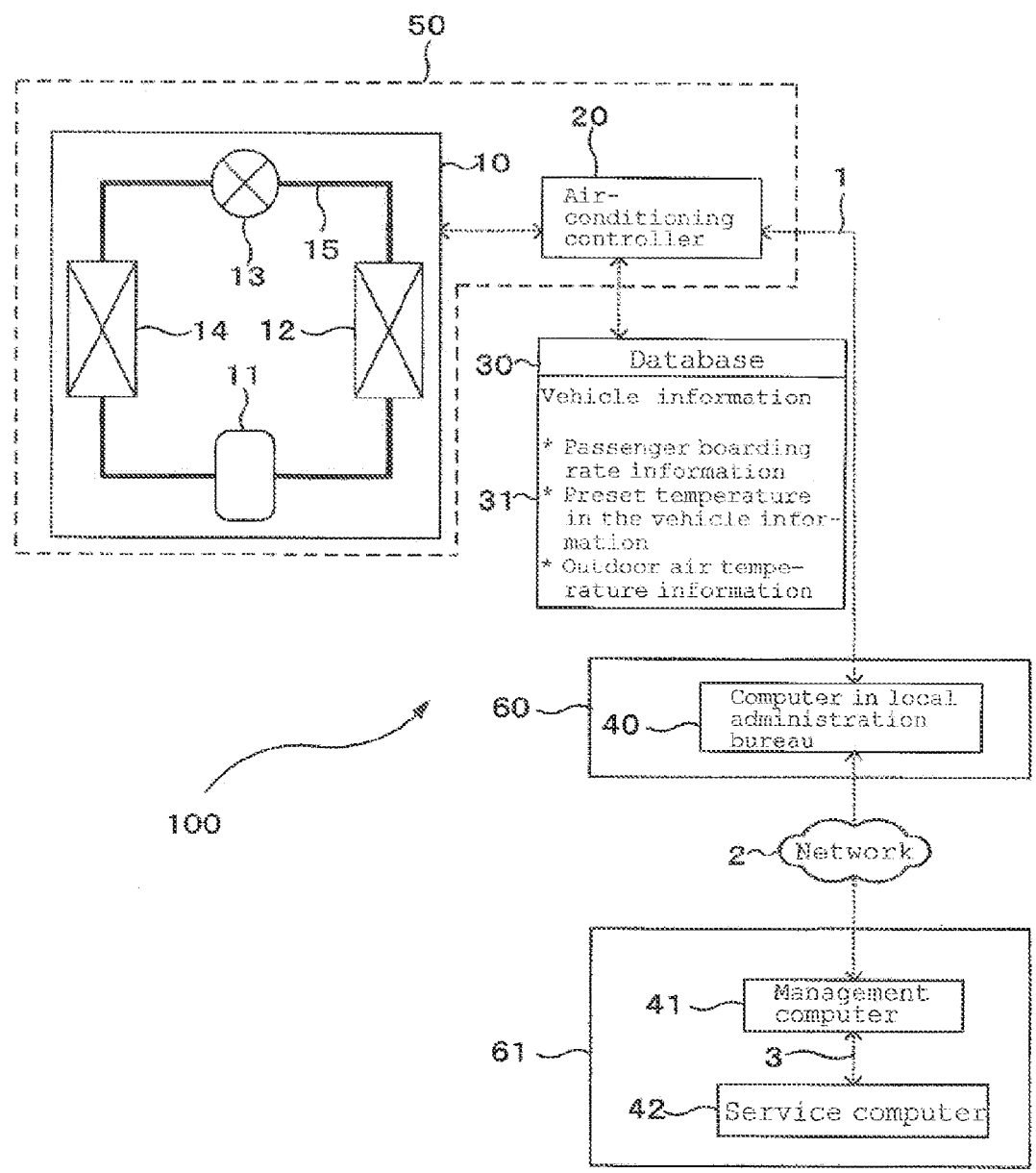
FIG. 1 is a schematic configuration diagram showing a schematic configuration of a vehicle air-conditioning management system according to an embodiment of the present invention.

DESCRIPTIONS OF CODES AND SYMBOLS 1 wireless
2 network
3 exclusive line
10 refrigeration cycle
11 compressor
12 condenser
13 pressure reducing device
14 evaporator
15 refrigerant piping
20 air-conditioning controller
30 database
31 vehicle information
40 computer in local administration bureau
41 management computer
42 service computer
50 air-conditioner for vehicle
60 local administration bureau
61 maintenance division
100 vehicle air-conditioning management system
101 operation room
102 display part Best Mode for Working the Invention Descriptions will be given to embodiments of the present invention based on the drawings as follows.

FIG. 1 is a schematic configuration diagram showing a schematic configuration of a vehicle air-conditioning management system according to an embodiment of the present invention. Based on FIG. 1, configurations of the vehicle air-conditioning management system 100 will be explained. The vehicle air-conditioning management system 100 has a function to grasp changes in a temperature in the vehicle from various environmental information (such as an outdoor air temperature, humidity in the vehicle, and a passenger boarding rate) to be a standard showing a comfortable environment in the vehicle and actual environment information, and detect abnormalities occurred in the components constituting a refrigeration cycle at an early stage to appropriately judge necessity and urgency of maintenance. In addition, in some cases including FIG. 1, a size relation of each component differs from an actual size in the drawings as follows.

The vehicle air-conditioning management system 100 is installed in a vehicle and includes a refrigeration cycle 10 that supplies air for air-conditioning in the vehicle, an air-conditioning controller 20 that controls the refrigeration cycle 10, database 30 connected with the air-conditioning controller 20 to store vehicle information 31 as data, a computer 40 in a local administration bureau performing a data communication with the air-conditioning controller 20 by a wireless 1, a management computer 41 that stores and processes data (information) transmitted from the air-conditioning controller 20, and a service computer 42 connected with the management computer 41 through an exclusive line 3. That is, the vehicle air-conditioning management system 100 is configured to keep an environment in the vehicle comfortable by the air-conditioning controller 20. In addition, the refrigeration cycle 10 and the air-conditioning controller 20 constitute an air-conditioner 50 for the vehicle.

The refrigeration cycle 10 is configured so that a compressor 11, a condenser 12, a pressure reducing device 13, and an evaporator 14 are connected through refrigerant piping 15 to circulate and actually performs cooling and heating operations in the railway vehicle. The compressor 11 compresses a refrigerant to turn it into a high-temperature and high-pressure refrigerant. The condenser 12 condenses and liquefies the refrigerant through a heat exchange between the refrigerant and air. The pressure reducing device 13 decompresses the refrigerant and may be constituted by, for example, a decompression valve, an expansion valve, a capillary tube, and so on. The evaporator 14 evaporates and gasifies the refrigerant through the heat exchange between the refrigerant and air. The refrigerant piping 15 communicates the gasified refrigerant by compression and the liquefied refrigerant by decompression. In addition, components of the refrigeration cycle 10 are a general term for the compressor 11, condenser 12, pressure reducing device 13, and evaporator 14, and the like.

The air-conditioning controller 20 integrally controls the refrigeration cycle 10 so as to achieve a predetermined preset temperature in the vehicle according to air-conditioning load conditions in the vehicle. That is, the air-conditioning controller 20 is configured to integrally control the refrigeration cycle 10 based on the vehicle information 31 (passenger boarding rate information, preset temperature information in the vehicle, outdoor air temperature information, and the like) and current vehicle information stored in the database 30. The air-conditioning controller 20 has a function that predicts abnormalities such as stain and degradation conditions in the components of the refrigeration cycle 10. Based on prediction results, the air-conditioning controller 20 judges a maintenance time of the components of the refrigeration cycle 10. (To be described in detail later) That is, the air-conditioning controller 20 is configured to judge necessity and urgency of maintenance based on vehicle information (including vehicle information 31).

The air-conditioning controller 20 not only displays such predicted results as above on a monitor (refer to FIG. 4) installed on the vehicle, but also has a function to transmit them to a maintenance division 61 that performs maintenance work of components of the refrigeration cycle 10. In addition, information transmitted from the air-conditioning controller 20 is configured to be delivered to the maintenance division 61 through a local administration bureau 60. Further, the air-conditioning controller 20 has a function to transmit the information to a management computer 41 that transmits operation information of the refrigeration cycle 10 on a regular basis. The air-conditioning controller 20 adjusts, for example, a driving frequency of the compressor 11 and a rotation speed of a blower installed in the vicinity of the condenser 12 and evaporator 14 to control the refrigeration cycle 10.

The database 30 performs a function as storage means and stores vehicle information 31. The vehicle information 31 stored in the database 30 is a standard that determines operation patterns of the refrigeration cycle 10 to be a general term of information necessary to maintain an environment in the vehicle such as passenger boarding rate information, preset temperature in the vehicle information, and outdoor air temperature information. The vehicle information 31 should be prepared to be subjected to change, modification, addition, and deletion with ease. Then, an environment setting is facilitated in accordance with locations where the railway is assigned. Kinds of the database 30 are not limited in particular.

Here, an example is shown for a case in which the air-conditioning controller 20 and database 30 are separately configured, however, it is not limited thereto. The vehicle information 31 may be stored into the database 30 as raw data, however, data amount is increased. Therefore, it is preferable to store it in a matrix form. In the vehicle air-conditioning management system 100, it is desirable to prepare detection means such as pressure detection means, temperature in the vehicle detection means, outdoor air temperature detection means, and humidity in the vehicle detection means(not shown) at a predetermined location. Then, such detection information may be transmitted to the air-conditioning controller 20 and stored in the database 30 as vehicle information 31. The passenger boarding rate may be prepared to be calculated using passenger boarding rate detection means such as a load weighting sensor that detects a weight of a vehicle.

When stain, clogging, and degradation occur in the components of the refrigeration cycle 10 (such as the compressor 11, condenser 12, and evaporator 14), those devices cannot achieve an original performance, so that the performance of the refrigeration cycle 10 declines. By focusing on this trend, in the vehicle air-conditioning management system 100, data to be a standard on various conditions (such as the passenger boarding rate, humidity in the vehicle, and outdoor air temperature) are pre-stored in the database 30 as vehicle information 31. The temperature and humidity in the vehicle are predicted from information actually detected, and by comparing them with measured values, it becomes possible to judge a cleaning time and a replacement time of components.

A computer 40 in a local administration bureau is installed in local administration bureaus 60 that are disposed in a plurality of areas along a railway track where a railroad runs to transmit and receive data through a wireless 1 with the air-conditioning controller 20. The management computer receives data transmitted by the air-conditioning controller 20 through the computer 40 in a local administration bureau connected to a network 2 such as the Internet to accumulate and process it. Further, the management computer 41 is configured to directly transmit a maintenance time of the components of the refrigeration cycle 10 judged by the air-conditioning controller 20 to a service computer 42 installed in the maintenance division 61. The service computer 42 is installed in the maintenance division 61 existing in such as a vehicle base to be connected with the management computer 41 through an exclusive line 3. That is, the service computer has a function to transmit necessity and urgency of maintenance judged by the air-conditioning controller 20 to the maintenance division 61.

Here, descriptions will be given to processing operation of the vehicle air-conditioning management system 100.

Figure 2:
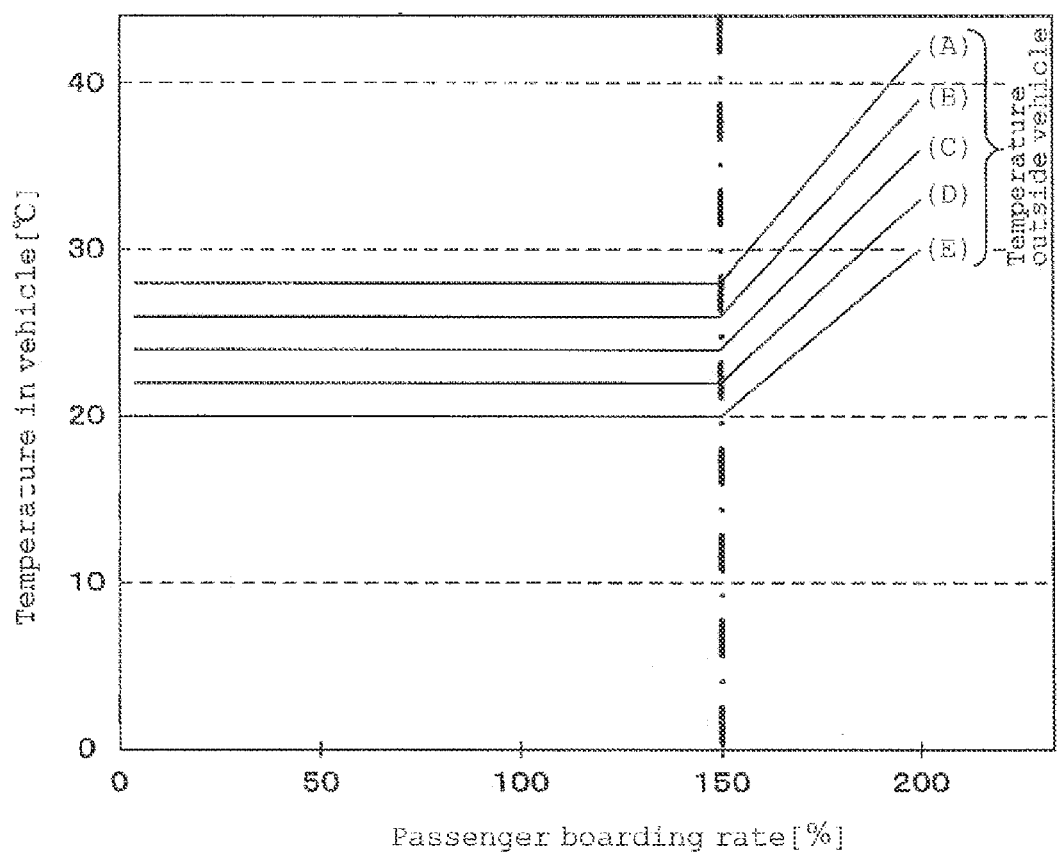
FIG. 2 is a graph showing rough changes in the temperature of the vehicle in association with a passenger boarding rate and an outdoor air temperature.

FIG. 2 is a graph showing rough changes in the temperature of the vehicle in association with a passenger boarding rate and an outdoor air temperature. Based on FIG. 2, processing operation will be explained firstly in accordance with changes in the temperature in the vehicle performed by the air-conditioning controller 20 of the air-conditioner 50 for the vehicle. In FIG. 2, a horizontal axis shows a passenger boarding rate [%] and a vertical axis shows a temperature in the vehicle [° C.], respectively. Further, an outdoor air temperature is shown by five patterns. The five patterns are denoted by a line (A) to a line (E) in order from higher to lower outdoor air temperatures.

The air-conditioning controller 20 firstly calculates a temperature T1 in the vehicle to be a standard in accordance with performance of the refrigeration cycle 10 from vehicle information 31 stored in the database 30. The temperature T1 in the vehicle is calculated for each vehicle and air-conditioning is performed for each vehicle. The air-conditioning controller 20 compares the calculated temperature T1 in the vehicle with a temperature T2 in the vehicle obtained from actual measurement. Then, from comparison results of the temperature T1 in the vehicle and temperature T2 in the vehicle, the air-conditioning controller 20 predicts abnormalities such as stain and degradation in the components of the refrigeration cycle 10 to judge necessity and urgency of maintenance. (As for a processing flow, detailed descriptions will be given in FIG. 5) In addition, the temperature T1 in the vehicle obtained by the refrigeration cycle 10 according to each air-conditioning preset temperature is associated with a passenger boarding rate and an outdoor air temperature and is stored in the database 30.

Figures 3, 4:
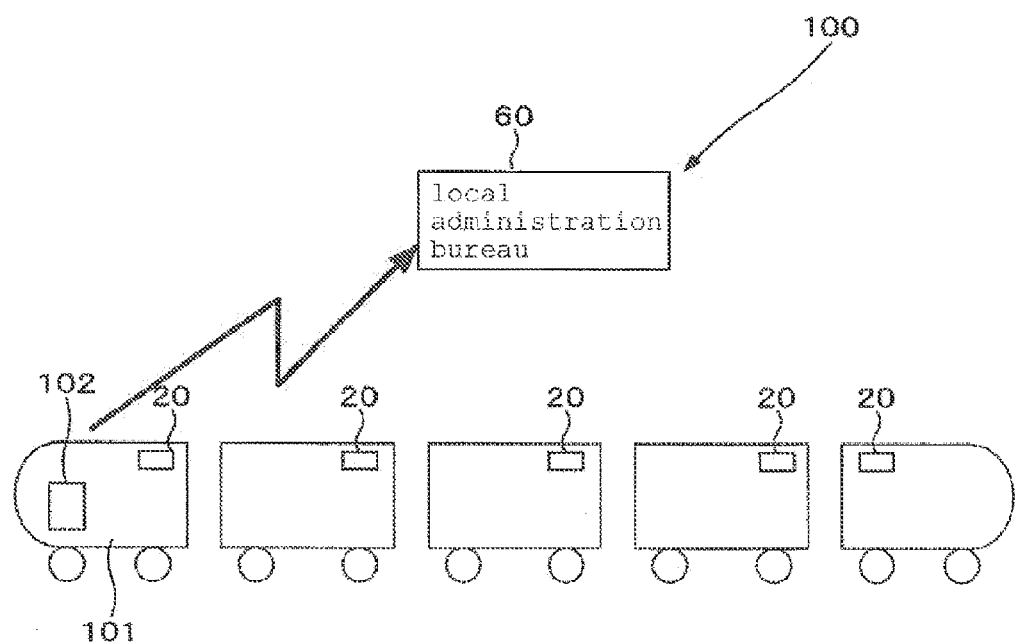
FIG. 3 is an explanatory drawing showing an evaluation example of stain and degradation conditions in the components of a refrigeration cycle.
FIG. 4 is an image diagram that illustrates information communication from an air-conditioning controller to a maintenance division.

FIG. 3 is an explanatory drawing showing an evaluation example of stain and degradation conditions in the component of a refrigeration cycle 10. Based on FIG. 3, descriptions will be given to a case in which by a prediction of occurrence of abnormalities in the components of the refrigeration cycle 10, the necessity of the maintenance work of the components is evaluated. That is, the air-conditioning controller 20 judges the necessity of a maintenance work by applying comparison results calculated based on vehicle information to a preset predetermined evaluation standard. As explained by FIG. 2, the air-conditioning controller 20 predicts abnormalities of the components of the refrigeration cycle 10 from comparison results of the temperature T1 in the vehicle and the temperature T2 in the vehicle to judge the necessity of maintenance. Further, the air-conditioning controller 20 transmits the results as data to the management computer 41.

For example, when an average of a temperature difference between the temperature T1 in the vehicle and the temperature T2 in the vehicle in a day is 0 degree to 1 degree (No. 1), it can be judged that it is the same as a standard temperature. Accordingly, it can be judged that no abnormality occurs such as stain and degradation in the components of the refrigeration cycle 10, so that no maintenance work is required such as investigation, inspection, repair, cleaning, and maintenance in order to make the environment in the vehicle comfortable. When the average is 1 degree to 2 degrees (No. 2), it can be judged that there is some stain, however, there is small influence on the performance. Therefore, it can be judged that the air-conditioning controller 20 requires no immediate maintenance, however, the maintenance time is approaching.

When the average is 2 degrees to 3 degrees (No. 3), it can be judged that stain is in progress. Therefore, it can be judged that without immediate maintenance, the air-conditioning controller 20 undergoes poor performance. Further, when the average is equal to or more than 4 degrees (No. 4), it can be judged that degradation is in progress beyond stain. Accordingly, the air-conditioning controller 20 can judge that it is time for replacement of the components as preventive maintenance. Thus, the maintenance time can be appropriately judged. The information is transmitted to the maintenance division 61 through the computer 40 in a local administration bureau, management computer 41, and service computer 42. In addition, in the case of abnormalities, not only the information is transmitted to the service computer 42, but also a warning may be given by a display part such as an operation panel and a screen and abnormality alarm means such as a buzzer and a signal.

FIG. 4 is an image diagram that illustrates information communication from an air-conditioning controller 20 to a maintenance division 61. Based on FIG. 4, descriptions will be given to information communication from the air-conditioning controller 20 installed in the vehicle to the maintenance division 61 existing in such as a vehicle base. In FIG. 4, a case is shown as an example in which the air-conditioning controller 20 is installed in each vehicle, however, it is not limited thereto. For example, it is allowable that an air-conditioning controller 20 is installed in any vehicle and the air-conditioning controller 20 is made to control air-conditioning of each vehicle.

As mentioned above, the air-conditioning controller 20 judges stain and degradation conditions in the components of the refrigeration cycle 10 to judge an appropriate maintenance time. The information is transmitted from the air-conditioning controller 20 to the management computer 41 through the computer 40 in a local administration bureau. Further, the air-conditioning controller 20 directly displays the information on a display part (monitor) 102 and the like installed in an operation room 101 of such as a head vehicle. Then, the management computer 41 transmits judgment information of the appropriate maintenance time judged by the air-conditioning controller 20 to the service computer 42 that is connected through an exclusive line 3. It is preferable that the service computer 42 directly displays judgment information of the maintenance time in the same way that it is displayed on the display part 102 of the operation room 101.

Thereby, since it becomes possible for the maintenance division 61 to appropriately judge the maintenance time, no need for maintenance on a regular basis and cost reduction of such as personnel expenses can be achieved. Further, since an early detection of abnormalities generated in the components is possible and the maintenance time can be appropriately judged by the abnormalities, it is possible to cope with abnormalities (a maintenance work and parts exchange) before performance of the refrigeration cycle 10 declines, so that a stable environment in the vehicle can be kept.

Figure 5:
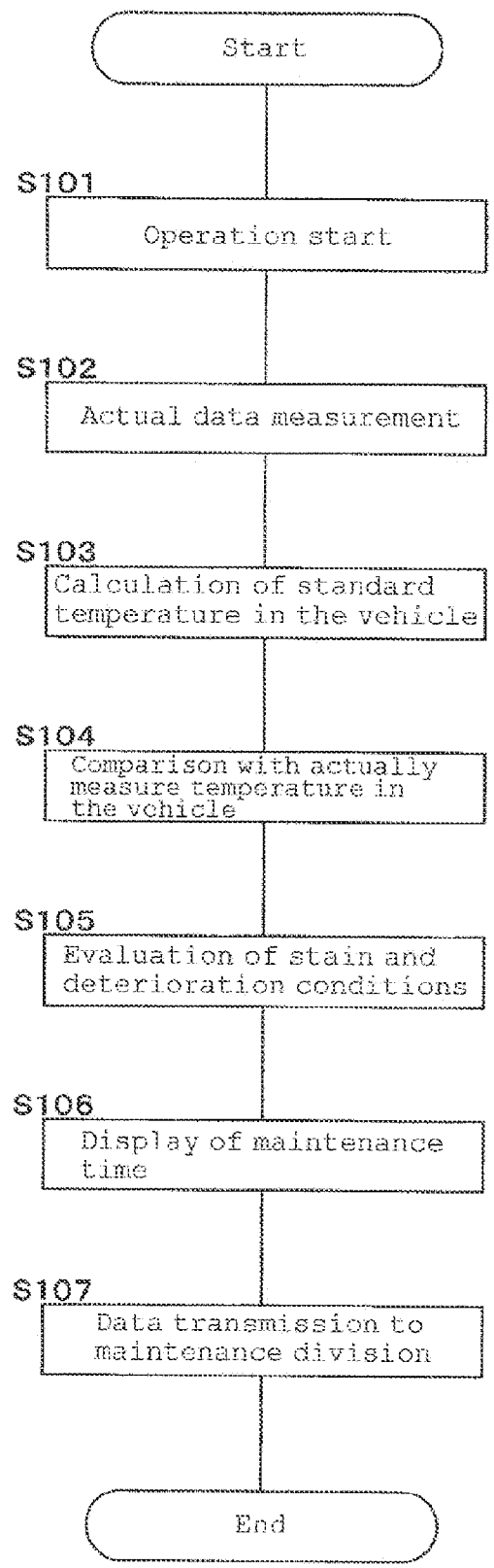
FIG. 5 is a flow chart showing a processing flow performed by a vehicle air-conditioning management system.

FIG. 5 is a flow chart showing a processing flow performed by a vehicle air-conditioning management system 100. Based on FIG. 5, detailed descriptions will be given to a processing flow performed by the vehicle air-conditioning management system 100. The vehicle air-conditioning management system 100 calculates data (a temperature T1 in the vehicle) to be a standard in advance to store it in the database 30 as vehicle information 31. In addition, various vehicle information 31 stored in the database 30 can be subjected to change, modification, addition, and deletion. Therefore, the vehicle information 31 can be changed because of seasonal changes, can be modified because of climatic changes, and can be added and deleted because of model changes of the components.

When a railroad train runs, the vehicle air-conditioning management system 100 comes into operation (step S101). That is, the air-conditioning controller 20 drives the refrigeration cycle 10. When the refrigeration cycle 10 comes into operation, actual data is measured in accordance with the statuses (step S102). The actual data is configured to be calculated from information which can be detected by detection means not shown such as a compressor stress sensor, a temperature sensor in the vehicle, an outdoor air temperature sensor, a humidity sensor, a load weighting sensor that obtains a passenger boarding rate. That is, information detected by these detection means is transmitted to the air-conditioning controller 20 to be turned into data. In addition, the detection information can be utilized as raw data.

The air-conditioning controller 20 calculates the temperature T1 in the vehicle to be a standard based on actual data (step S103). The air-conditioning controller 20 compares the calculated temperature T1 in the vehicle and the temperature T2 in the vehicle obtained by an actual measurement (step S104). Then, the air-conditioning controller 20 predicts abnormalities such as stain and degradation in the components of the refrigeration cycle 10 from comparison results of the temperature T1 in the vehicle and the temperature T2 in the vehicle (step S105). That is, as explained by FIG. 3, from a temperature difference between the temperature T1 in the vehicle and the temperature T2 in the vehicle, the air-conditioning controller 20 predicts abnormalities such as stain and degradation in the components of the refrigeration cycle 10.

Moreover, the air-conditioning controller 20 judges an appropriate maintenance time from the prediction results. The air-conditioning controller 40 transmits the information to the management computer 41 through the computer 40 in a local administration bureau. The management computer 41 stores and processes received information to directly transmit it to the service computer 42. Then, the service computer 42 displays the received maintenance time to the maintenance division 61 (step S106). Thereby, the service computer 42 is configured to transmit occurrence of abnormalities such as stain and degradation in the components of the refrigeration cycle 10 and an appropriate maintenance time transmitted from the management computer 41 to the maintenance division 61 (step S107).

As mentioned above, the maintenance division 61 can appropriately judge the maintenance time, so that no need for maintenance on a regular basis and cost reduction of such as personnel expenses can be achieved. Further, since not only an early detection of abnormalities generated in the components is possible, but also an appropriate judgment on the maintenance time is possible by the abnormalities, it is possible to cope with abnormalities (a maintenance work and parts exchange) before performance of the refrigeration cycle 10 declines, so that a stable environment in the vehicle can be kept.

In the above-mentioned embodiments, descriptions are given to an adjustment of an environment in the vehicle in the case of a cooling operation or a heating operation, however, it is not limited thereto. For example, when installing a humidity controller such as a dehumidification unit and a humidification unit that adjust a humidity environment in the vehicle, it becomes possible to cope with not only a temperature but also humidity in the vehicle. Thereby, it becomes possible to more efficiently keep a comfortable environment in the vehicle. In addition, descriptions are given to an example in which the computer 40 in the local administration bureau, the management computer 41, and the service computer 42 are disposed at different locations, however, they can be disposed at the same location as a single computer. The transmission path connecting each computer is not limited to the one mentioned above.

The invention claimed is:

1. An air-conditioner for a vehicle comprising:
a refrigeration cycle whose components are at least a compressor, a condenser, a pressure reducing device, and an evaporator; and
an air-conditioning controller controlling said refrigeration cycle; wherein
said air-conditioning controller predicts stain and deterioration conditions of the components of said refrigeration cycle from a difference between a temperature T1 in a vehicle in association with at least a passenger boarding rate and an outdoor air temperature and an actual temperature T2 in the vehicle, for every air-conditioning preset temperature of the vehicle.

2. The air-conditioner for a vehicle of claim 1, wherein
said air-conditioning controller displays a prediction result of stain and degradation conditions of the components of said refrigeration cycle on a monitor installed on the vehicle, and transmits the same to a maintenance division that performs a maintenance work of the components of said refrigeration cycle.

3. The air-conditioner for a vehicle of claim 1, wherein
said air-conditioning controller judges a maintenance time of the components of said refrigeration cycle by applying a comparison result of the temperatures to a preset predetermined evaluation standard.

4. A vehicle air-conditioning management system comprising:
the air-conditioner for a vehicle of claim 1; and
a management computer that is installed at a maintenance division, stores and processes data transmitted from said air-conditioning controller, and at the same time directly transmits the maintenance time of the components of said refrigeration cycle to a service computer installed at the maintenance division.

5. A method of managing vehicle air-conditioning that predicts abnormalities of components of a refrigeration cycle mounted on a vehicle to judge a maintenance time of said components, the method comprising:
storing, in a storage device, a temperature T1 in the vehicle;
comparing, by a processing device, the temperature T1 in the vehicle in association with at least a passenger boarding rate and an outdoor air temperature with a temperature T2 in the vehicle obtained when the refrigeration cycle is actually driven for every air-conditioning preset temperature;
predicting, by the processing device, abnormalities of the components of said refrigeration cycle based on a comparison result of the temperatures;
judging, by the processing device, a maintenance time of the components of said refrigeration cycle by applying said comparison result to a preset predetermined evaluation standard; and
transmitting, by a transmitting device, a judgment result of the maintenance time to a maintenance division.

6. The air-conditioner for a vehicle of claim 2, wherein
said air-conditioning controller judges a maintenance time of the components of said refrigeration cycle by applying a comparison result of the temperatures to a preset predetermined evaluation standard.

7. A vehicle air-conditioning management system comprising:
the air-conditioner for a vehicle of claim 2; and
a management computer that is installed at said maintenance division, stores and processes data transmitted from said air-conditioning controller, and at the same time directly transmits the maintenance time of the components of said refrigeration cycle to a service computer installed at the maintenance division.

* * * * *